(12) United States Patent
Shin et al.

(10) Patent No.: US 9,679,701 B2
(45) Date of Patent: Jun. 13, 2017

(54) TANTALUM CAPACITOR

(71) Applicant: SAMSUNG ELECTRO-MECHANICS CO., LTD., Suwon-Si, Gyeonggi-Do (KR)

(72) Inventors: Hong Kyu Shin, Suwon-Si (KR); Wan Suk Yang, Suwon-Si (KR); Hyun Sub Oh, Suwon-Si (KR); Jae Bum Cho, Suwon-Si (KR); Jeong Oh Hong, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 68 days.

(21) Appl. No.: 14/316,498

(22) Filed: Jun. 26, 2014

(65) Prior Publication Data

US 2015/0270070 A1 Sep. 24, 2015

(30) Foreign Application Priority Data

Mar. 21, 2014 (KR) .................. 10-2014-0033093

(51) Int. Cl.

| | |
|---|---|
| *H01G 9/012* | (2006.01) |
| *H01G 9/15* | (2006.01) |
| *H01G 9/052* | (2006.01) |
| *H01G 9/10* | (2006.01) |

(52) U.S. Cl.
CPC ............. *H01G 9/012* (2013.01); *H01G 9/052* (2013.01); *H01G 9/10* (2013.01); *H01G 9/15* (2013.01)

(58) Field of Classification Search
CPC .......... H01G 9/012; H01G 9/004; H01G 9/08; H01G 9/04; H01G 9/15; H01G 9/10

USPC ......... 361/523, 525–529, 535–536, 540–541
See application file for complete search history.

(56) References Cited

U.S. PATENT DOCUMENTS

| 5,638,253 | A | * | 6/1997 | Hasegawa | H01G 9/012 361/523 |
|---|---|---|---|---|---|
| 6,262,878 | B1 | * | 7/2001 | Shirashige | H01G 9/012 361/508 |
| 8,000,086 | B2 | * | 8/2011 | Okada | H01G 9/012 361/539 |
| 8,441,777 | B2 | * | 5/2013 | Zednicek | H01G 9/012 361/525 |
| 2007/0035912 | A1 | * | 2/2007 | Hahn | H01G 9/012 361/528 |

(Continued)

FOREIGN PATENT DOCUMENTS

| KR | 10-2008-0063680 A | 7/2008 |
|---|---|---|
| KR | 10-2010-0065596 A | 6/2010 |

*Primary Examiner* — Nguyen T Ha
(74) *Attorney, Agent, or Firm* — McDermott Will & Emery LLP

(57) ABSTRACT

A tantalum capacitor includes a capacitor body containing a tantalum powder and having a tantalum wire protruding to one side surface thereof, a molding part enclosing the tantalum wire and the capacitor body so as to allow an end portion of the tantalum wire to be exposed through one side surface thereof, a positive electrode terminal extended from one side surface of the molding part to a portion of a lower surface thereof and connected to the end portion of the tantalum wire, and a negative electrode terminal extended from the other side surface of the molding part to a portion of the lower surface thereof and connected to the other side surface of the capacitor body.

14 Claims, 4 Drawing Sheets

(56) References Cited

U.S. PATENT DOCUMENTS

| | | | |
|---|---|---|---|
| 2008/0094812 A1* | 4/2008 | Kuriyama | H01G 2/065 361/761 |
| 2008/0247122 A1* | 10/2008 | Vaisman | H01G 2/065 361/533 |
| 2009/0122470 A1* | 5/2009 | Matsuoka | H01G 2/06 361/540 |
| 2010/0142125 A1 | 6/2010 | Kim et al. | |
| 2015/0036265 A1* | 2/2015 | Shin | H01G 9/15 361/529 |

* cited by examiner

TANTALUM CAPACITOR

CROSS-REFERENCE TO RELATED APPLICATION

This application claims the benefit of Korean Patent Application No. 10-2014-0033093 filed on Mar. 21, 2014, with the Korean Intellectual Property Office, the disclosure of which is incorporated herein by reference.

BACKGROUND

The present disclosure relates to a tantalum capacitor.

A tantalum (Ta) material is a metal widely used throughout industries such as space and military fields, and the like, as well as electric, electronic, mechanic, and chemical engineering fields due to mechanical or physical properties such as a high melting point, excellent flexibility and corrosion-resistance, and the like.

Since the tantalum material may form a stable anodized film, it has been widely used as a material of an anode of a small capacitor. Recently, in accordance with the rapid development of the information technology (IT) industry such as electronic and information communications industries, a use amount of a tantalum material has rapidly increased by 10% every year.

A capacitor generally indicates a condenser temporally storing electricity therein. For example, the capacitor is a component electrifying and accumulating electric charges by attractive force in a state in which two flat plate electrodes insulated from each other approach each other and a dielectric is inserted therebetween, and may be used to obtain capacitance by confining electric charges and an electric field in a space enclosed by two conductors.

A tantalum capacitor using the tantalum material has a structure using a gap created when a tantalum powder is sintered and solidified.

For example, the tantalum capacitor may be completed by forming tantalum oxide ($Ta_2O_5$) on a surface of tantalum using an anodizing method, forming a manganese dioxide ($MnO_2$) layer, which is an electrolyte, on the tantalum oxide serving as a dielectric and forming a carbon layer and a metal layer on the manganese dioxide layer to form a body, and electrically connecting positive and negative electrode terminals to the body and forming a molding part for mounting of a printed circuit board (PCB).

Recently, as high value-added electronic products such as smart phones have been released, capacitors able to be driven at a high frequency have been demanded. However, general tantalum capacitors do not satisfy this demand.

In addition, equivalent series inductance (ESL) in the tantalum capacitor indicates parasitic inductance on a circuit. Decreasing the ESL of tantalum capacitor has become a very important issue in the design of PCB power units.

RELATED ART DOCUMENT

Korean Patent Laid-Open Publication No. 2010-0065596

SUMMARY

Some embodiments of the present disclosure may provide a tantalum capacitor capable of implementing relatively low equivalent series inductance (ESL) in a high frequency band.

According to some embodiments of the present disclosure, a tantalum capacitor may include: a capacitor body containing a tantalum powder and having a tantalum wire protruding to one side surface thereof; a molding part enclosing the tantalum wire and the capacitor body to allow an end portion of the tantalum wire to be exposed through one side surface of the molding part; a positive electrode terminal extended from one side surface of the molding part to a portion of a lower surface thereof and connected to the end portion of the tantalum wire; and a negative electrode terminal extended from the other side surface of the molding part to a portion of the lower surface thereof and connected to the other side surface of the capacitor body.

An interval between the positive electrode terminal and the negative electrode terminal on the lower surface of the molding part may be 200 to 400 μm.

A sum of areas of the positive electrode terminal and the negative electrode terminal on the lower surface of the molding part may be 60 to 80% of that of the lower surface of the molding part.

The tantalum capacitor may further include a conductive adhesive layer formed between the other side surface of the capacitor body and the negative electrode terminal.

The conductive adhesive layer may contain an epoxy based thermosetting resin and a conductive metal powder.

The positive electrode terminal may have a groove formed in an edge thereof on the lower surface of the molding part.

The groove formed in the edge of the positive electrode terminal may have a semi-circular shape and may have a diameter ø of 0.15 to 0.40 mm.

The capacitor body may include a plurality of tantalum wires protruding to one side surface thereof.

According to some embodiments of the present disclosure, a tantalum capacitor may include: a capacitor body containing a tantalum powder and including a tantalum wire protruding to one side surface thereof; a molding part enclosing the tantalum wire and the capacitor body to allow an end portion of the tantalum wire to be exposed through one side surface of the molding part; an insulating member formed on a lower surface of the molding part; a positive electrode terminal extended from one side surface of the molding part to a portion of a lower surface of the insulating member and connected to the end portion of the tantalum wire; and a negative electrode terminal extended from the other side surface of the molding part to a portion of the lower surface of the insulating member and including a mounting part extended to a position between the capacitor body and the insulating member and connected to a lower surface of the capacitor body.

An interval between the positive electrode terminal and the negative electrode terminal on the lower surface of the insulating member may be 200 to 400 μm.

A sum of areas of the positive electrode terminal and the negative electrode terminal on the lower surface of the insulating member may be 60 to 80% of that of the lower surface of the insulating member.

The tantalum capacitor may further include a conductive adhesive layer formed between the capacitor body and the mounting part of the negative electrode terminal.

The conductive adhesive layer may contain an epoxy based thermosetting resin and a conductive metal powder.

The positive electrode terminal may have a groove formed in an edge thereof on the lower surface of the insulating member.

The groove formed in the edge of the positive electrode terminal may have a semi-circular shape and may have a diameter ø of 0.15 to 0.40 mm.

The capacitor body may include a plurality of tantalum wires protruding to one side surface thereof.

The insulating member may have a thickness of 40 to 100 μm.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
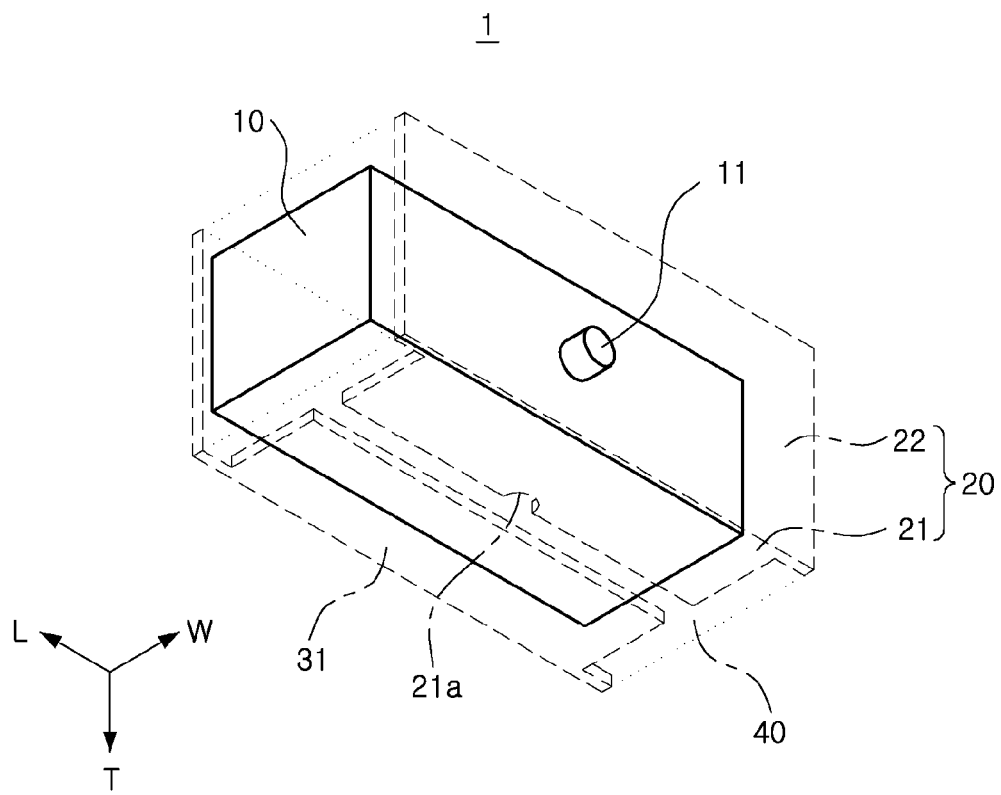
FIG. 1 is a transparent perspective view schematically illustrating a structure of a tantalum capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, in an exemplary embodiment of the present disclosure, for convenience of explanation, a front surface or one side surface refers to a surface of a molding part from which a tantalum wire protrudes, both end surfaces of the molding part refer to end surfaces of the molding part in a length direction thereof, upper and lower surfaces of a capacitor body refer to surfaces of a capacitor body in a thickness direction thereof, and a surface used at the time of mounting refers to a lower surface thereof.

Figure 2:
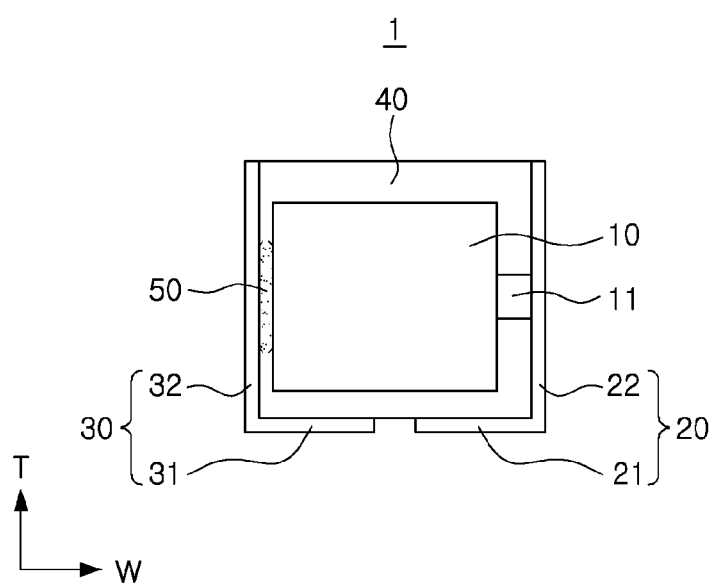
FIG. 2 is a side cross-sectional view of the tantalum capacitor of FIG. 1.
Figure 3:
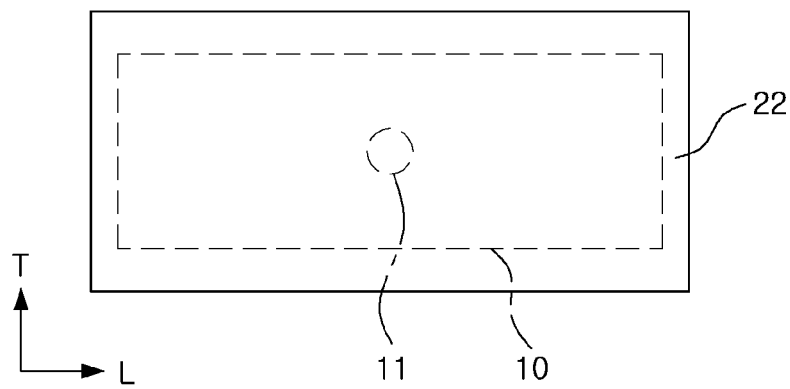
FIG. 3 is a front perspective view illustrating a front surface of the tantalum capacitor of FIG. 1.
Figure 4:
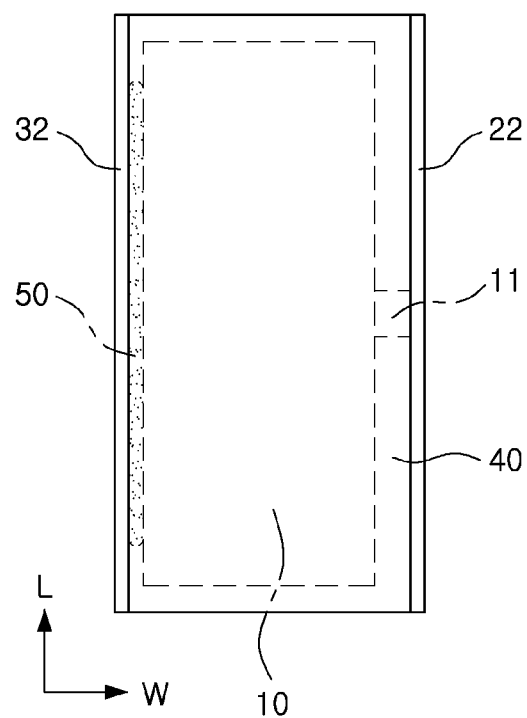
FIG. 4 is a plan perspective view illustrating a plane of the tantalum capacitor of FIG. 1.

FIG. 1 is a transparent perspective view schematically illustrating a structure of a tantalum capacitor according to an exemplary embodiment of the present disclosure; FIG. 2 is a side cross-sectional view of the tantalum capacitor of FIG. 1; FIG. 3 is a front perspective view illustrating a front surface of the tantalum capacitor of FIG. 1; and FIG. 4 is a plan perspective view illustrating a plane of the tantalum capacitor of FIG. 1.

Referring to FIGS. 1 through 4, a tantalum capacitor 1 according to the exemplary embodiment of the present disclosure may include a capacitor body 10 having a tantalum wire 11 led to a front surface, for example, one side surface thereof, a molding part 40 enclosing the tantalum wire 11 and the capacitor body 10, a positive electrode terminal 20 electrically connected to the tantalum wire 11, and a negative electrode terminal 30 electrically connected to the capacitor body 10.

The capacitor body 10 may have a negative polarity. The capacitor body 10 may have a rectangular parallelepiped shape. However, the present disclosure is not limited thereto.

For example, the capacitor body 10 may be manufactured by mixing a tantalum powder and binders with each other at a predetermined ratio, agitating them, compressing and molding the mixed and agitated powder in a rectangular parallelepiped shape, and then sintering the molded body at a relatively high temperature under high vacuum.

For example, the capacitor body 10 may be manufactured by inserting the tantalum wire 11 into the tantalum powder with which the binders are mixed, forming a tantalum element having a required size, and then sintering the tantalum element at a temperature of about 1,000 to 2,000° C. under high vacuum atmosphere ($10^{-5}$ torr or less) for about 30 minutes.

Carbon or silver (Ag) may be applied to a surface of the capacitor body 10, when necessary.

The carbon may be to decrease contact resistance of the surface of the capacitor body 10, and the silver may be used for allowing for a negative electrode to be led out.

The tantalum wire 11 may have a positive polarity. Here, the tantalum wire 11 may be inserted into and mounted in the capacitor body 10 so as to be eccentric from the center of the capacitor body 10, for example, so as to be disposed at a position biased toward a lower surface in a T direction, the lower surface being a mounting surface of the capacitor body 10, before the mixed and agitated powder is compressed.

The molding part 40 may enclose the tantalum wire 11 and the capacitor body 10. Here, the molding part 40 may be formed so that one end portion of the tantalum wire 11 is exposed through one side surface thereof.

The molding part 40 may serve to protect the capacitor body 10 and the tantalum wire 11 from an external environment and may be mainly formed using epoxy, silica based epoxy molding compound (EMC), or the like. However, the present disclosure is not limited thereto.

The positive electrode terminal 20 may be extended from one side surface of the molding part 40 to a portion of a lower surface thereof and may include a positive electrode terminal portion 21 and a positive electrode connecting portion 22.

The positive electrode terminal 20 may be formed by a process of dry-sputtering or plating at least one or more selected from a group consisting of Cr (Ti), Cu, Ni, Pd, and Au.

The positive electrode terminal portion 21 may be apart of the positive electrode terminal 20 formed on the lower surface of the molding part 40.

In addition, the positive electrode terminal portion 21 may have a groove 21a formed in an edge thereof. The groove 21a may serve to represent polarity. In addition, the groove 21a may have a semi-circular shape and may have a diameter ϕ of 0.15 to 0.40 mm, as needed. However, the present disclosure is not limited thereto.

The positive electrode terminal portion 21 may be used as a terminal for electrical connection with a different electronic product.

Since the positive electrode terminal portion 21 is formed on the lower surface of the molding part, which is the mounting surface of the molding part 40, volume efficiency of the capacitor body 10 may be improved as compared with a structure in which lead terminals formed at upper and lower portions of a product according to the related art are led to both sides of the molding part 40 to configure a terminal.

In addition, an area of the positive electrode terminal portion 21 may be at least 30 to 40% of that of the lower surface of the molding part 40. However, the present disclosure is not necessarily limited thereto.

In the case in which the area of the positive electrode terminal portion 21 is less than 30% of that of the lower surface of the molding part 40, when the tantalum capacitor is mounted in a product, a mounting area is excessively small, such that a product defective rate may be increased. In the case in which the area of the positive electrode terminal portion 21 exceeds 40% of that of the lower surface of the molding part 40, an interval between the positive electrode terminal 20 and the negative electrode terminal 30 are excessively reduced, such that when the tantalum capacitor is mounted in the product, an occurrence rate of a defect such as short circuits may be increased.

The positive electrode connecting portion 22 may be a part of the positive electrode terminal 20 formed on one side surface of the molding part 40, and may contact and be electrically connected to an end portion of the tantalum wire 11 exposed to one side surface of the molding part 40.

Here, the end portion of the tantalum wire 11 and the positive electrode connecting portion 22 may have a conductive adhesive layer (not shown) formed therebetween.

In addition, the conductive adhesive layer may contain an epoxy based thermosetting resin and a conductive metal powder.

The negative electrode terminal 30 may be extended from the other side surface of the molding part 40 to a portion of the lower surface thereof and may include a negative electrode terminal portion 31 and a negative electrode connecting portion 32.

The negative electrode terminal 30 may be formed by a process of dry-sputtering or plating at least one or more selected from a group consisting of Cr (Ti), Cu, Ni, Pd, and Au.

The negative electrode terminal portion 31 may be a part of the negative electrode terminal 30 formed on the lower surface of the molding part 40. The negative electrode terminal portion 31 may be spaced apart from the positive electrode terminal portion 21 by a predetermined interval.

The negative electrode terminal portion 31 may be used as a terminal for electrical connection with a different electronic product.

Since the negative electrode terminal portion 31 is formed on the lower surface of the molding part, which is the mounting surface of the molding part 40, volume efficiency of the capacitor body 10 may be improved as compared with a structure in which lead terminals formed at upper and lower portions of a product according to the related art are led to both sides of the molding part 40 to configure a terminal.

In addition, an area of the negative electrode terminal portion 31 may be at least 30 to 40% of that of the lower surface of the molding part 40. However, the present disclosure is not necessarily limited thereto.

In the case in which the area of the negative electrode terminal portion 31 is less than 30% of that of the lower surface of the molding part 40, when the tantalum capacitor is mounted in the product, a mounting area is excessively small, such that a product defective rate may be increased. In the case in which the area of the negative electrode terminal portion 31 exceeds 40% of that of the lower surface of the molding part 40, the interval between the positive electrode terminal 20 and the negative electrode terminal 30 is excessively reduced, such that when the tantalum capacitor is mounted in the product, the occurrence rate of a defect such as short circuits may be increased.

Therefore, the sum of the areas of the positive electrode terminal portion 21 and the negative electrode terminal portion 31 on the lower surface of the molding part 40 may be 60 to 80% of that of the lower surface of the molding part.

Here, an interval between the positive electrode terminal portion 21 and the negative electrode terminal portion 31 on the lower surface of the molding part 40 may be 200 to 400 µm. In the case in which the interval between the positive electrode terminal portion 21 and the negative electrode terminal portion 31 is less than 200 µm, the positive electrode terminal 20 and the negative electrode terminal 30 are excessively close to each other, such that when the tantalum capacitor is mounted in the product, an occurrence rate of a defect such as short circuits may be increased. In the case in which the interval between the positive electrode terminal portion 21 and the negative electrode terminal portion 31 exceeds 400 µm, a problem that an equivalent series inductance (ESL) value is increased may occur.

The negative electrode connecting portion 32 may be a part of the negative electrode terminal 30 formed on the other side surface of the molding part 40 and may be electrically connected to the other side surface of the capacitor body 10.

Here, the other side surface of the capacitor body 10 and the negative electrode connecting portion 32 may have a conductive adhesive layer 50 formed therebetween.

In addition, the conductive adhesive layer 50 may contain an epoxy based thermosetting resin and a conductive metal powder.

In order to decrease ESL of a capacitor, a current loop, a distance between electrodes, may be relatively short, and the number of current paths through which a current passes may be increased. Generally, when the number of terminals is increased, the number of current paths may be increased.

In the case of the tantalum capacitor 1 according to the exemplary embodiment of the present disclosure having a structure in which it does not include a frame, a distance between the positive electrode terminal portion 21 of the positive electrode terminal 20 and the negative electrode terminal portion 31 of the negative electrode terminal 30 is decreased to about ⅓ of a distance therebetween in a structure in which the tantalum wire is exposed to one end surface of the capacitor body, in the case of chips having the same size as each other, such that a current loop for connection between electrodes may be significantly short. In addition, the tantalum wire 11 is eccentrically inserted toward the mounting surface, such that the current loop is further decreased, whereby the ESL of the capacitor may be further decreased.

For example, in a chip having a length×width of 16 mm×8 mm, a distance between a positive electrode terminal and a negative electrode terminal on a mounting surface may be about 1.05 mm in the case of a structure according to the related art in which a tantalum wire is exposed to one end surface of a capacitor body, while a distance between a positive electrode terminal and a negative electrode terminal may be about 0.38 mm in the case of the present exemplary embodiment, which is a value significantly decreased as compared with the structure according to the related art.

Therefore, a length of a current path based on a positive (+) direction is about 0.9 mm in the case according to the related art, while a length of a current path based on a positive (+) direction is about 0.68 mm in the case of the present exemplary embodiment, which is a value decreased as compared with the case according to the related art.

In addition, the sum of areas of the positive electrode terminal portion 21 and the negative electrode terminal portion 31 on the mounting surface of the capacitor is increased 1.8 times or more as compared with the structure in which the tantalum wire 11 is exposed to one end surface of the capacitor body 10, in the case of the chips having the same size as each other, such that the areas of portions in which the positive electrode terminal portion 21 and the positive electrode connecting portion 22 and the negative electrode terminal portion 31 and the negative electrode connecting portion 32 are connected to each other, respectively, may be increased 1.8 times or more as compared with the structure in which the tantalum wire 11 is exposed to one end surface of the capacitor body 10.

Therefore, an amount of conductive pastes applied in order to form the negative electrode terminal 30 is increased three times or more as compared with the capacitor according to the related art, whereby equivalent series resistance (ESR) and ESL of the capacitor may be further decreased. For example, in the chip having a length×width of 16 mm×8 mm, the area of the positive electrode terminal 20 or the negative electrode terminal 30 on the mounting surface is 1.28 mm$^2$ in the case of the structure according to the related art in which the tantalum wire 11 is exposed to one end surface of the capacitor body 10, while the area of the positive electrode terminal 20 or the negative electrode terminal 30 may be 2.23 mm$^2$ in the case of the present exemplary embodiment, which is a value increased as compared with the structure according to the related art.

Figure 5:
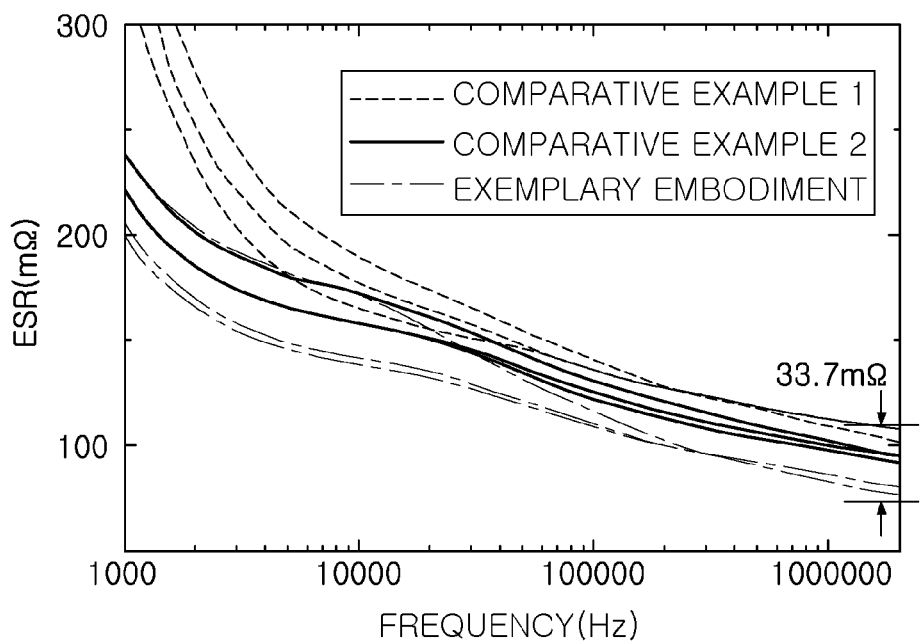
FIG. 5 is a graph for comparing equivalent series resistances (ESRs) of a tantalum capacitor according to the related art and the tantalum capacitor according to an exemplary embodiment of the present disclosure.

FIG. 5 is a graph for comparing ESRs of a tantalum capacitor according to the related art and the tantalum capacitor according to an exemplary embodiment of the present disclosure, from a low frequency to 1 MHz, with each other.

In FIG. 5, Comparative Example 1 indicates a tantalum capacitor that has a length×width of 16 mm×8 mm and includes a frame according to the related art, Comparative Example 2 indicates a tantalum capacitor that has a length×width of 16 mm×8 mm, does not include a frame, and has a structure in which a tantalum wire protrudes to one end surface of a capacitor body, and the exemplary Embodiment indicates a tantalum capacitor according to an exemplary embodiment of the present disclosure that has a width×length of 8 mm×16 mm as a case opposite to that of Comparative Example 2 and does not include frame.

Generally, the tantalum capacitor may be affected by different features depending on whether a frequency is a frequency before a resonance frequency or is a frequency after the resonance frequency. Here, a change from a low frequency band to the resonance frequency may be a change affected by ESR, and a change from the resonance frequency to a high frequency band (for example, 1 to 6 GHz) may be a change affected by ESL. Here, the ESL may be calculated by measuring ESL values from a corresponding resonance frequency to the high frequency band and then calculating an average value of the measured ESL values. For example, when the ESR may be significantly decreased at the resonance frequency, the ESL acting after the resonance frequency may also be decreased.

Referring to FIG. 5, it may be appreciated that in a high frequency region, an ESR level is decreased by about 33.7 mΩ in the exemplary Embodiment as compared with Comparative Example 1 and is significantly lowered in Embodiment as compared with Comparative Example 2.

Figure 6:
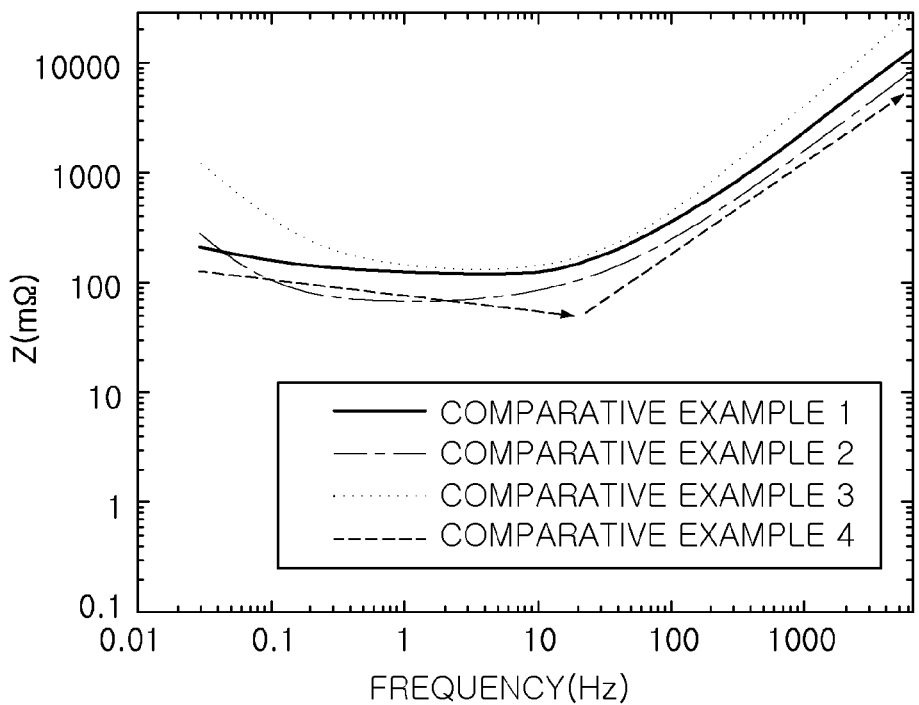
FIG. 6 is a graph for comparing equivalent series inductances (ESLs) of a tantalum capacitor according to the related art and the tantalum capacitor according to an exemplary embodiment of the present disclosure with each other.

FIG. 6 is a graph for comparing ESLs of a tantalum capacitor according to the related art and the tantalum capacitor according to an exemplary embodiment of the present disclosure with each other.

Here, Comparative Example 1 indicates a tantalum capacitor that does not include a frame and has a structure in which a tantalum wire protrudes to one end surface of a capacitor body, Comparative Example 2 indicates a tantalum capacitor that includes a frame and has a lower mounting structure, Comparative Example 3 indicates a tantalum capacitor that includes a frame and has a side mounting structure, and the exemplary Embodiment indicates a tantalum capacitor according to an exemplary embodiment of the present disclosure that does not include a frame and has a structure in which a tantalum wire protrudes to one side surface of a capacitor body.

Generally, ESL of the tantalum capacitor may be determined by a distance (current loop) between adjacent electrodes.

When comparing Comparative Examples 1 to 3 and Embodiment of FIG. 6 with each other, the current loop may be reduced in a sequence of Comparative Example 2, Comparative Example 1, Comparative Example 3, and Embodiment.

When comparing Comparative Examples 1 to 3, except for the exemplary Embodiment, with each other, Comparative Example 2 that includes the frame and has the lower mounting structure may have the shortest current loop among Comparative Examples 1 to 3, Comparative Example 1 may have a current loop longer than that of Comparative Example 2, and Comparative Example 3 may have a current loop longer than that of Comparative Example 1.

In addition, referring to FIG. 6, it may be appreciated that a measured ESL of the tantalum capacitor is reduced in a sequence of Comparative Example 2, Comparative Example 1, and Comparative Example 3. Therefore, it may be appreciated that the ESL value of the tantalum capacitor is in proportion to a length of the current loop.

Therefore, it may be confirmed that the tantalum capacitor according to Embodiment that does not include the frame and has the structure in which the tantalum wire protrudes to one side surface of the capacitor body has a current loop shorter than those of Comparative Examples 1 to 3, such that it has the lowest ESL value among Comparative Examples and the exemplary Embodiment, as shown in FIG. 6.

Here, the ESL may be a value most greatly influencing impedance after the resonance frequency, and an impedance value at the resonance frequency may indicate a minimum ESR of a corresponding capacitor.

When comparing existing structures except for an exemplary embodiment of the present disclosure with each other, the tantalum capacitor that includes the frame and has the lower mounting structure may have the shortest current loop, the tantalum capacitor that does not include the frame and has the structure in which the tantalum wire protrudes to one end surface of the capacitor body may have a current loop longer than that of the tantalum capacitor that includes the frame and has the lower mounting structure, and the tantalum capacitor that includes the frame and has the side mounting structure may have a current loop longer than that of the tantalum capacitor that does not include the frame and has the structure in which the tantalum wire protrudes to one end surface of the capacitor body. It has also been confirmed through measurement of the ESL that the tantalum capacitor including the frame and having the lower mounting structure to have the shortest current loop had the lowest ESL, and the tantalum capacitor including the frame and having the side mounting structure had the highest ESL, as in FIG. 6. This may experimentally mean that the ESL is affected by the length of the current loop. Therefore, it could be confirmed that the tantalum capacitor not including the frame and having the structure in which the tantalum wire protruded to the side surface of the capacitor body rather than to one end surface thereof had the shortest current loop so as to have the lowest ESL value.

Modified Example

Figure 7:
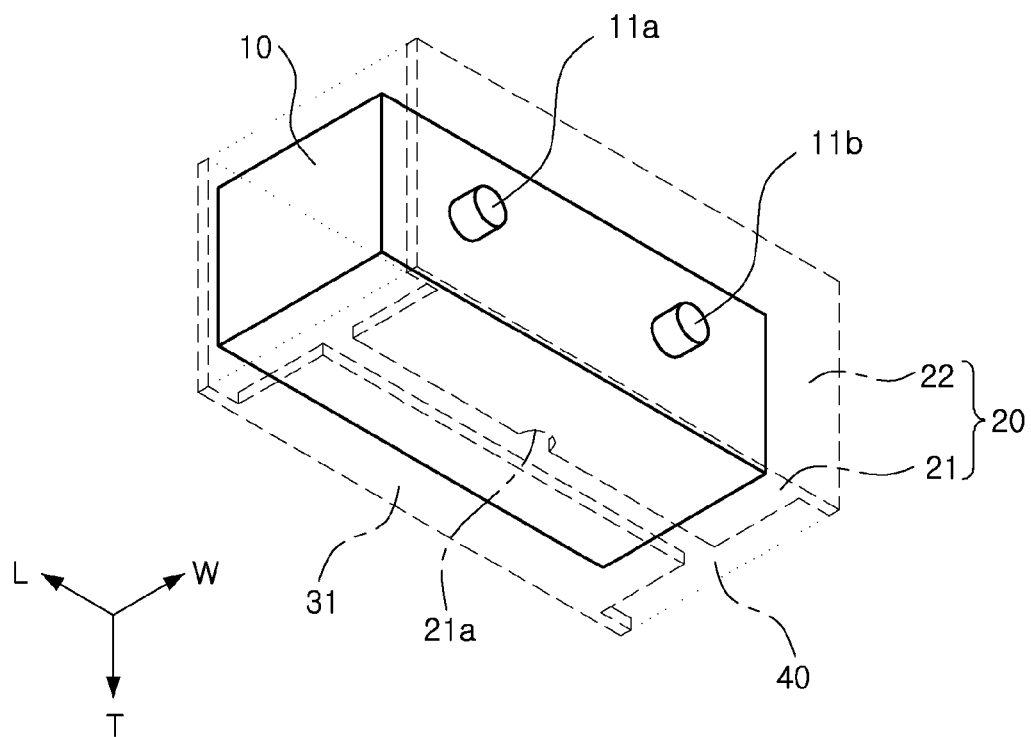
FIG. 7 is a transparent perspective view schematically illustrating a structure of a tantalum capacitor according to another exemplary embodiment of the present disclosure.

FIG. 7 is a transparent perspective view schematically illustrating a structure of a tantalum capacitor according to another exemplary embodiment of the present disclosure.

Referring to FIG. 7, a tantalum capacitor 2 according to another exemplary embodiment of the present disclosure may include a plurality of tantalum wires 11a and 11b protruding to one side surface of a capacitor body 10.

When the plurality of tantalum wires 11a and 11b are formed on one side surface of the capacitor body 10, they may be disposed to be biased to both ends in an L direction, respectively, rather than inwardly toward the center, on one side surface of the capacitor body 10. When the tantalum wires 11a and 11b are disposed to be biased toward both ends, respectively, on one side surface of the capacitor body 10, ESR of the tantalum capacitor 2 may be further decreased. In addition, the tantalum wires 11a and 11b are formed to be biased toward a positive electrode terminal portion 21 of a positive electrode terminal 20 on one side surface of the capacitor body, and a length of a current path is decreased, such that ESL of the tantalum capacitor 2 may be further decreased.

Here, since structures of a molding part 40, a positive electrode terminal 20, and a negative electrode terminal 30 are similar to those of the molding part 40, the positive electrode terminal 20, and the negative electrode terminal 30 of the tantalum capacitor according to the foregoing exemplary embodiment of the present disclosure, a detailed description thereof will be omitted in order to avoid an overlapping description.

Figure 8:
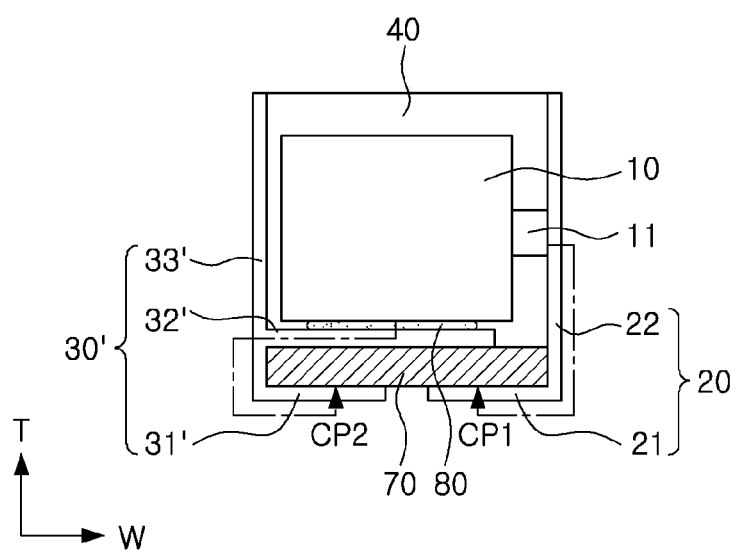
FIG. 8 is a side cross-sectional view schematically illustrating a structure of a tantalum capacitor according to another exemplary embodiment of the present disclosure.

FIG. 8 is a side cross-sectional view schematically illustrating a structure of a tantalum capacitor according to another exemplary embodiment of the present disclosure.

Referring to FIG. 8, a tantalum capacitor 3 according to another exemplary embodiment of the present disclosure may include a capacitor body 10, a molding part 40, an insulating member 70, a positive electrode terminal 20, and a negative electrode terminal 30'.

Here, since structures of the capacitor body 10, the molding part 40, and the positive electrode terminal 20 are similar to those of the capacitor body 10, the molding part 40, and the positive electrode terminal 20 of the tantalum capacitor according to the foregoing exemplary embodiment of the present disclosure, a detailed description thereof will be omitted in order to avoid an overlapping description, and the insulating member 70 and the negative electrode terminal 30' having structures different from those of the tantalum capacitor according to the foregoing exemplary embodiment of the present disclosure will be described.

The insulating member 70 may be formed on a lower surface of the molding part 40. Here, the insulating member may be formed of, for example, glass fiber or a polymer based material having a relatively high insulation property and a relatively low contraction rate. However, the present disclosure is not limited thereto.

The insulating member 70 may serve to adjust a distance between the capacitor body 10 and positive electrode and negative electrode terminal portions 21 and 31' and prevent electrical short circuits therebetween. Generally, the capacitor body 10 may have an insulating resistance of $10^9 \Omega$ or more and a dielectric constant of 5.4 or less. In consideration of this point, a thickness of the insulating member 70 may be 40 to 50 μm. However, the present disclosure is not limited thereto.

The positive electrode terminal 20 may be extended from one side surface of the molding part 40 to a portion of a lower surface of the insulating member 70. Here, a positive electrode connecting portion 22 of the positive electrode terminal 20 may be connected to an end portion of a tantalum wire 11.

In addition, an area of the positive electrode terminal portion 21 may be at least 30 to 40% of that of the lower surface of the insulating member 70.

The negative electrode terminal 30' may be extended from the other side surface of the molding part 40 to a portion of the lower surface of the insulating member 70. Here, the positive electrode terminal portion 21 and the negative electrode terminal portion 31' may be spaced apart from each other.

In addition, the negative electrode terminal 30' may include a mounting part 32' extended from a negative electrode connecting portion 33' to a portion between the capacitor body 10 and the insulating member 70. The mounting part 32' may be connected to a lower surface of the capacitor body 10 to have an electrical connection.

Here, the mounting part 32' may have a thickness of 10 μm or less. When a thickness of the mounting part 32' exceeds 10 μm, a surface having relatively low electrical resistance may be implemented, but a size of a product may be excessively increased, which has an influence on production and a cost. However, the present disclosure is not limited thereto.

In addition, an area of the negative electrode terminal portion 31' may be at least 30 to 40% of that of the lower surface of the insulating member 70.

Therefore, the sum of areas of the positive electrode terminal portion 21 and the negative electrode terminal portion 31' on the lower surface of the insulating member 70 may be 60 to 80% of that of the lower surface of the insulating member 70.

Here, an interval between the positive electrode terminal portion 21 and the negative electrode terminal portion 31' on the lower surface of the insulating member 70 may be 200 to 400 μm.

In the exemplary embodiment of the present disclosure, a lower surface of the capacitor body 10 directly contacts and is connected to the mounting part 32', such that a contact area between the capacitor body 10 and the negative electrode terminal 30' is increased as compared with the case according to the foregoing exemplary embodiment of the present disclosure in which the negative electrode terminal contacts the side surface of the capacitor body, whereby ESR may be further decreased.

Further, in the case of a current path, in the exemplary embodiment of the present disclosure, not only a current CP2 flows through the mounting part 32' contacting the lower surface of the capacitor body 10, but a current CP1 flows through one side surface of the capacitor body 10 connected to the tantalum wire 11, so as to be similar to the case in an embodiment in which resistors are connected to each other in parallel, such that ESR may be further decreased.

In addition, a conductive adhesive layer 80 may be formed between the lower surface of the capacitor body 10 and the mounting part 32'.

Here, the conductive adhesive layer 80 may contain an epoxy based thermosetting resin and a conductive metal powder.

According to exemplary embodiments of the present disclosure, in a structure in which the frame is not present, the tantalum wire protrudes to one side surface of the capacitor body, such that a distance between the positive electrode terminal portion and the negative electrode terminal portion is decreased, whereby ESL of the tantalum capacitor in a high frequency band may be decreased.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor comprising:
   a capacitor body containing a tantalum powder and having a tantalum wire protruding to one side surface of the capacitor body;
   a molding part enclosing the tantalum wire and the capacitor body to allow an end portion of the tantalum wire to be exposed through one side surface of the molding part in a width direction of the capacitor body;
   a positive electrode terminal extended from one side surface of the molding part to a portion of a lower surface of the molding part and connected to the end portion of the tantalum wire; and
   a negative electrode terminal extended from the other side surface of the molding part to a portion of the lower surface of the molding part and connected to the other side surface of the capacitor body,
   wherein an interval between the positive electrode terminal and the negative electrode terminal on the lower surface of the molding part is 200 to 400 µm, and
   wherein a sum of areas of the positive electrode terminal and the negative electrode terminal on the lower surface of the molding part is 60 to 80% of that of the lower surface of the molding part.

2. The tantalum capacitor of claim 1, further comprising a conductive adhesive layer formed between the other side surface of the capacitor body and the negative electrode terminal.

3. The tantalum capacitor of claim 2, wherein the conductive adhesive layer contains an epoxy based thermosetting resin and a conductive metal powder.

4. The tantalum capacitor of claim 1, wherein the positive electrode terminal has a groove formed in an edge thereof on the lower surface of the molding part.

5. The tantalum capacitor of claim 4, wherein the groove formed in the edge of the positive electrode terminal has a semi-circular shape and has a diameter Ø of 0.15 to 0.40 mm.

6. The tantalum capacitor of claim 1, wherein the capacitor body includes a plurality of tantalum wires protruding to one side surface of the capacitor body.

7. The tantalum capacitor of claim 1, wherein a length of the capacitor body is greater than a width of the capacitor body.

8. A tantalum capacitor comprising:
   a capacitor body containing a tantalum powder and including a tantalum wire protruding to one side surface of the capacitor body;
   a molding part enclosing the tantalum wire and the capacitor body to allow an end portion of the tantalum wire to be exposed through one side surface of the molding part;
   an insulating member formed on a lower surface of the molding part;
   a positive electrode terminal extended from one side surface of the molding part to a portion of a lower surface of the insulating member and connected to the end portion of the tantalum wire; and
   a negative electrode terminal extended from the other side surface of the molding part to a portion of the lower surface of the insulating member and including a mounting part extended to a position between the capacitor body and the insulating member and connected to a lower surface of the capacitor body,
   wherein an interval between the positive electrode terminal and the negative electrode terminal on the lower surface of the molding part is 200 to 400 µm, and
   wherein a sum of areas of the positive electrode terminal and the negative electrode terminal on the lower surface of the molding part is 60 to 80% of that of the lower surface of the molding part.

9. The tantalum capacitor of claim 8, further comprising a conductive adhesive layer formed between the capacitor body and the mounting part of the negative electrode terminal.

10. The tantalum capacitor of claim 9, wherein the conductive adhesive layer contains an epoxy based thermosetting resin and a conductive metal powder.

11. The tantalum capacitor of claim 8, wherein the positive electrode terminal has a groove formed in an edge thereof on the lower surface of the insulating member.

12. The tantalum capacitor of claim 11, wherein the groove formed in the edge of the positive electrode terminal has a semi-circular shape and has a diameter Ø of 0.15 to 0.40 mm.

13. The tantalum capacitor of claim 8, wherein the capacitor body includes a plurality of tantalum wires protruding to one side surface thereof.

14. The tantalum capacitor of claim 8, wherein the insulating member has a thickness of 40 to 100 µm.

* * * * *